(12) United States Patent
Smith

(10) Patent No.: US 6,548,793 B1
(45) Date of Patent: Apr. 15, 2003

(54) APPARATUS AND METHOD OF INDUCTIVELY HEAT TREATING A BEVELED GEAR

(75) Inventor: Todd A. Smith, Ft. Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/893,563

(22) Filed: Jun. 29, 2001

(51) Int. Cl.[7] ................................................ H05B 6/14
(52) U.S. Cl. ........................................ 219/640; 148/573
(58) Field of Search ................................. 219/640, 647, 219/650, 635, 637, 639, 658, 652; 266/125, 126; 148/330, 573

(56) References Cited

U.S. PATENT DOCUMENTS

| | | |
|---|---|---|
| 2,167,798 A | 8/1939 | Denneen et al. |
| 2,364,623 A | 12/1944 | Denneen et al. |
| 2,390,559 A | 12/1945 | Sherman |
| 2,398,085 A | 4/1946 | Denneen et al. |
| 2,424,816 A | 7/1947 | Groven et al. |
| 2,857,154 A | 10/1958 | Jones |
| 3,236,993 A | 2/1966 | Jones |
| 3,555,233 A | 1/1971 | Pfaffman |
| 4,675,488 A * | 6/1987 | Mucha et al. ................ 219/640 |
| 5,310,432 A * | 5/1994 | Fukui et al. ................ 148/330 |
| 6,011,246 A * | 1/2000 | Bonzano et al. ............ 219/640 |

\* cited by examiner

Primary Examiner—Teresa Walberg
Assistant Examiner—Quang Van
(74) Attorney, Agent, or Firm—Liniak, Berenato & White

(57) ABSTRACT

An apparatus and method to inductively heat beveled gear teeth. An inductor has an annular body with a plurality of projections for meshingly engaging beveled of the gear. An inductor coil or loop is associated with each of the projections and is at least partially disposed between successive gear teeth to induce a magnetic flux directly there through when engaging the beveled gear. By simply rotating the inductor relative to the beveled gear while simultaneously sending a current through the coil, successive gear teeth are treated. Preferably, the number of gear teeth differs from the number of projections, and the beveled gear is rotated sufficiently to ensure that each of the projections and associated coil engages each of the beveled gear teeth to facilitate a more uniform treatment.

15 Claims, 2 Drawing Sheets

APPARATUS AND METHOD OF INDUCTIVELY HEAT TREATING A BEVELED GEAR

BACKGROUND OF THE INVENTION

1. Field of the Invention

The present invention is directed to a method and apparatus for heat treating gear teeth and more particularly to a method and apparatus to inductively heat treat beveled gear teeth.

2. Description of the Related Art

The advantages of selective surface hardening of gear teeth are well known in the art. The generic notion of inductively heat treating conventional spur gear teeth is also known in the art. Several static embodiments are known whereby a member is disposed between or adjacent gear teeth. In these devices, a member is disposed between each gear tooth, or a series of gear teeth, and a magnetic flux is induced through the gear teeth. However, each gear tooth is treated by a single and separate member resulting un-uniform treatment of the teeth. Moreover, heat treating the gear teeth individually or just a few of the gear teeth at a time is costly and time consuming.

It is also known in the art to provide a rotatable interface between an inductive heating element and a conventional spur or straight gear. However, these devices do not adequately induce a magnetic flux directly through the gear teeth. Furthermore, these prior art devices are adapted to treat conventional spur or straight gears and are not applicable for treating beveled gears. Such prior art devices are disclosed in the following U.S. Pat. Nos.: 3,555,233; 3,236,993; 2,424,816; 2,398,085; 2,390,559; and 2,364,623 which are each incorporated herein by reference.

Heretofore, inductive heat treatment of bevel gear teeth has been limited to a fixed flat inductor coil simply positioned adjacent the beveled gear. However, these devices have a gap between the coil and the root of the tooth. Such devices fail to provide adequate treatment in the root area of the tooth thus reduce case depth treatment. Such a drawback results in weaker gears. None of the prior art devices provides a mechanism for uniformly induction heating beveled gear teeth or so treating beveled gears to reach sufficient case depth in the root area of the tooth.

SUMMARY OF THE INVENTION

The present invention is directed to apparatus and method of heat treating beveled gear teeth that both provide uniform treatment and sufficient case depth in the root are of the tooth. An inductor has an annular body with a plurality of projections closely resembling the profile of the beveled gear teeth for meshingly engaging the bevel gear. An inductor coil or loop is associated with each of the projections or other means to generate a magnetic flux around each projection. The projections are adapted to be at least partially disposed between successive gear teeth to induce a magnetic flux directly there through when engaging the beveled gear. By simply rotating the inductor relative to the beveled gear while simultaneously sending a current through the coil, successive gear teeth are treated. Because magnetic flux is generated around the projections within and between each gear teeth, the case depth of the induction heat treatment is increased to the root area of the tooth. Furthermore, the number of gear teeth differs from the number of projections, and the beveled gear is rotated sufficiently to ensure that each of the projections and associated coil engages each of the beveled gear teeth to facilitate a more uniform treatment.

DESCRIPTION OF THE PREFERRED EMBODIMENT

Figure 1:
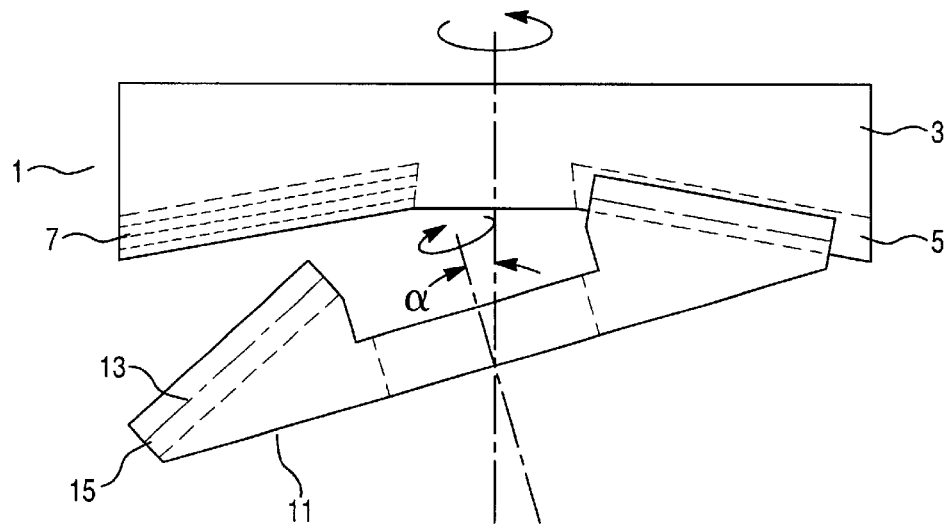
FIG. 1 is a schematic view of an inductor coil and bevel gear according to the present invention.

Referring now to the drawings and more particularly to FIG. 1, an inductor coil 1 is formed of a substantially annular body 3 having a plurality of projections 5. Each of the projections has an associated inductor loop or coil schematically shown as reference 7. It is understood that the coil loops 7 may be embedded within the projections 5 or wrapped there about or laminated thereon. These coil loops 7 are connected to a current source (not shown) for inducing a magnetic flux between projections. The exact specific configuration of the loops around each projection is not critical to the invention so long as a magnetic flux is generated about and through each projection 5. For example, the coil loops may wrap or otherwise extend radially about or through each projection 5. Such an arrangement generates a magnetic flux extending in a tangential direction relative to a radial line extending from an axis of rotation of the inductor coil 1. It is understood that the teachings of the prior art fully enable one skilled in the art to construct such coil loops and form a connection with a current source. The annular body may be made of a ferrous metal such as iron and other suitable materials are also possible.

The inductor coil 1 is rotatably supported in space about a first axis of rotation (the details of such a rotatable connection are not shown). Likewise a bevel gear 11 having bevel gear teeth 13 is rotatably supported in space about a second axis so as to meshingly engage the projections 5 of the inductor coil 3. As clearly shown in FIG. 1, the inductor coil 1 and bevel gear 11 are in rotatable relationship with respect to one another. Because the gear teeth 13 are bevel gear teeth, the first and second rotation axes are acutely positioned relative to one another as shown by angle α in FIG. 1. As either of the inductor coil 1 or bevel gear 11 rotates, so shall the other member. Consequently, the projections 5 of the inductor coil 1 successively engage the bevel gear teeth 13 of the bevel gear 11.

As the inductor coil 1 and bevel gear 11 rotate, current is provided through the coil loops 7. Consequently a magnetic flux is generated through the bevel gear teeth 13. Because the coil loops 7 are wound about/through the projections 5, the coil loops 7 extend proximate the root area 15 of the tooth. Thus the induced magnetic flux extends directly through the gear teeth 13 adjacent the root area 15 thereof thus increasing the surface treatment area of the gear 11.

Figure 3:
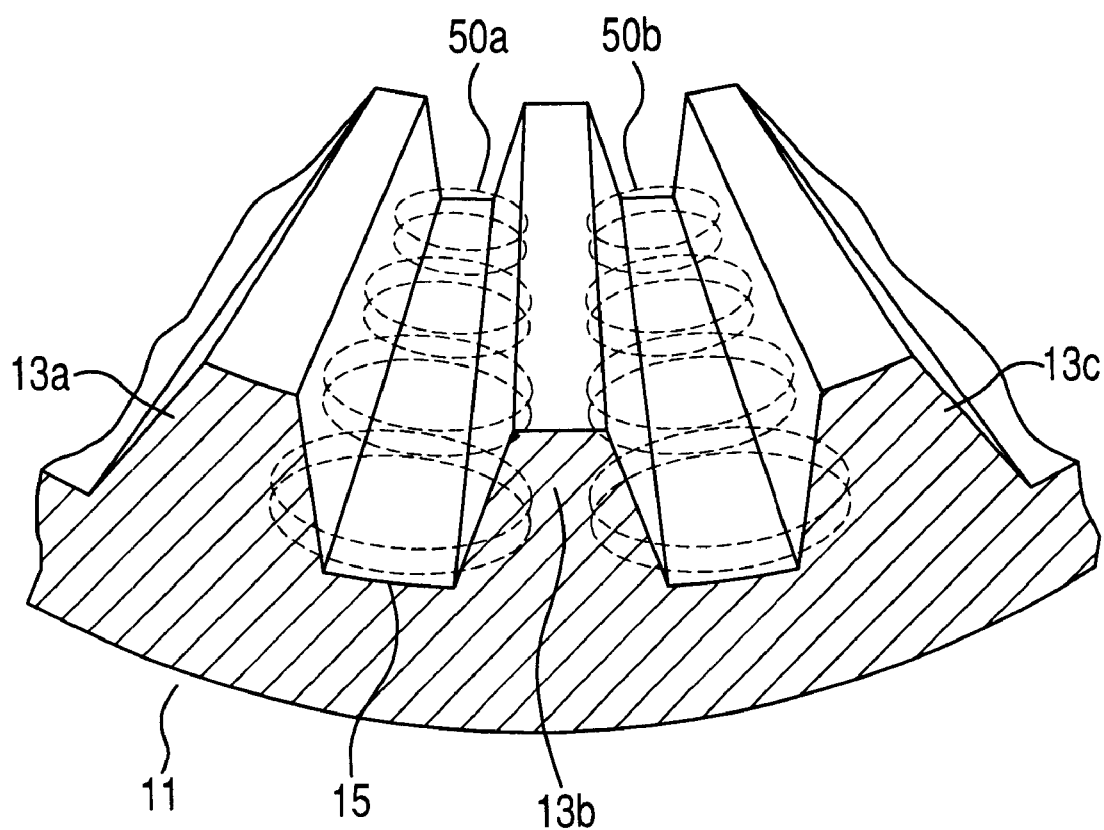
FIG. 3 is an exposed partial section view of the bevel gear depicting the induced magnetic flux lines.

As can be seen in FIG. 3, as a projection 5 (not shown in FIG. 3) is disposed between gear teeth 13a, and 13b, a magnetic flux 50a is generated extending substantially through each gear tooth 13a, 13b. As a subsequent projection 5 progresses into and between successive gear teeth 13b, and 13b, magnetic flux 50b extends substantially through each of the successive gear teeth 13b and 13c. Consequently, each gear tooth 13 is exposed to the induced magnetic flux and is consequently heated. As the inductor coil 1 and bevel gear 11 continue to rotate, each successive gear teeth 13 are subject to induction heating. By simply controlling the current level and the duration and speed at which the inductor coil 1 and bevel gear 11 rotate, the magnitude of the heating may be simply controlled. Preferably, the number of projections 5, and the number of gear teeth 13 differ by at least one. In this fashion, a single one of the projections 5 may engage each of the gear teeth 13 to promote a more uniform heat treatment eliminating the tolerance differences that may exist between each of the coil loops 7 associated with each projection 5. Most preferably, the inductor coil 1 and bevel gear 11 are continued to rotate to ensure that each projection 5 engages each gear tooth 13 of the bevel gear 1 to maximize the uniformity to which the bevel gear teeth 13 are heated.

Once the bevel gear teeth 13 are heated, subsequent cooling or quenching may take place to promote a desired hardness as is known in the art.

Figure 2:
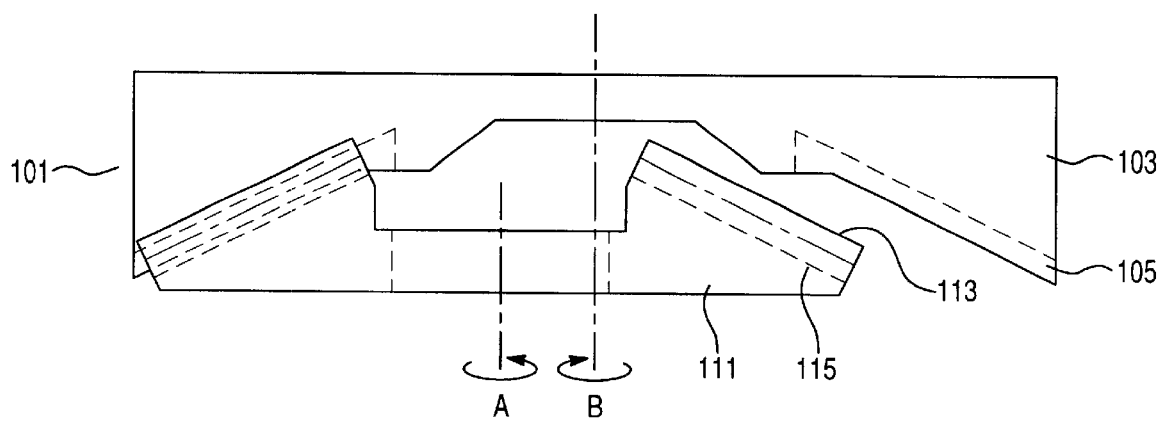
FIG. 2 is a schematic view of an inductor coil and bevel gear according to an alternate embodiment of the present invention.

Referring now to FIG. 2, an inductor coil 101 has an annular body 103 and projections 105. As in the previous embodiment of FIG. 1, each projection has coil loops to generate a magnetic flux. However, in the present embodiment, the inductor coil 101 is fixed in space. The bevel gear 111 is arranged such that gear teeth 113 meshingly engage the projections 105 of the inductor coil. However, unlike the embodiment of FIG. 1, the bevel gear 111 is rotated about its axis A and the entire bevel gear 111 orbits a centerline B of the inductor coil. The remaining aspects of the embodiment of FIG. 3 remain much the same as the embodiment of FIG. 1 with regards to the control of the relative rotation between the inductor 101 and bevel gear 111, as well as the amount of current supplied to the coil loops.

While the foregoing invention has been shown and described with reference to a preferred embodiment, it will be understood by those possessing skill in the art that various changes and modifications may be made without departing from the spirit and scope of the invention.

What is claimed is:

1. An inductor for induction heating a beveled gear having a first number of beveled gear teeth, comprising:

an annular body having a second number of projections for meshingly engaging said beveled gear teeth and defining a continuous rotatable interface therebetween; and an inductor coil associated with each of said projections;

wherein, when said projections meshingly engage said beveled gear teeth, said inductor coil is at least partially disposed between adjacent bevel gear teeth to induce a flux therein, and continued relative rotation between said annular body and said beveled gear successively and continuously induces flux in said adjacent beveled gear teeth.

2. The inductor as claimed in claim 1, wherein said first number of beveled gear teeth and second number of projections differ by at least one thereby facilitating a uniform heat treatment of said bevel gear teeth.

3. The inductor according to claim 1, wherein said annular body and associated inductor coil are fixed in space and said bevel gear is arranged coplanar with said annular body and orbits a centerline of said annular body as said beveled gear rotates.

4. The inductor according to claim 1, wherein said annular body and associated inductor coil rotates about a first axis, said beveled gear rotates about a second axis offset and parallel to said first axis, and said second axis orbits about said first axis.

5. The inductor according to claim 1, wherein said inductor coil associated with each of said projections comprises a plurality of coil loops wound about each of said projections.

6. The inductor according to claim 5, wherein said coil loops are laminated onto an external surface of said projections.

7. The inductor according to claim 5, wherein said coil loops are embedded within an external surface of said projections.

8. The inductor according to claim 5, wherein said coil loops extend through said projections.

9. An apparatus for induction heating a beveled gear having a first number of beveled gear teeth, comprising:

an annular body having a second number of projections for meshingly engaging said beveled gear teeth and defining a continuous rotatable interface therebetween; and an inductor coil associated with each of said projections;

wherein, when said projections meshingly engage said beveled gear teeth, said inductor coil is at least partially disposed between adjacent bevel gear teeth to induce a flux therein, and continued relative rotation between said annular body and said beveled gear successively and continuously induces flux in said adjacent beveled gear teeth;

wherein said annular body and associated inductor coil rotates about a first axis, said beveled gear rotates about a second axis, and said first and second axes are acutely arranged relative to each other.

10. A method of induction heating a beveled gear having a plurality of beveled gear teeth; said method comprising the steps of:

providing a substantially annular inductor coil having a plurality of projections each having an associated coil loop, said inductor coil being in continuous rotatable relationship with said beveled gear such that said projections meshingly engage said beveled gear teeth upon relative rotation between said inductor coil and said beveled gear teeth;

providing a current through said inductor coil and said associated coil loops such that a magnetic flux is induced directly through at least one of said gear teeth of said beveled gear while engaging one of said projections;

rotating said inductor coil relative to said beveled gear teeth while providing said current through said inductor coil and said associated coil loops such that continuous relative rotation between said beveled gear and said inductor coil successively induces magnetic flux through successive gear teeth, and continuing to rotate said inductor coil relative to said beveled gear until each of said beveled gear teeth has been sufficiently heated.

11. The method according to claim 10, further comprising the following steps:

arranging said inductor coil fixed in space and said bevel gear coplanar with said inductor coil, said step of rotating said inductor coil relative to said bevel gear includes rotating said beveled gear upon an axis thereof and causing said beveled gear to orbit a centerline of said inductor coil.

12. A method of induction heating a beveled gear having a plurality of beveled gear teeth; said method comprising the steps of:

providing a substantially annular inductor coil having a plurality of projections, said inductor coil being in continuous rotatable relationship with said beveled gear such that said projections meshingly engage said beveled gear teeth upon relative rotation between said inductor coil and said beveled gear teeth;

providing a current through said inductor coil such that a magnetic flux is induced directly through at least one of said gear teeth of said beveled gear while engaging one of said projections;

rotating said inductor coil relative to said beveled gear teeth while providing said current through said inductor coil such that continuous relative rotation between said beveled gear and said inductor coil successively induces magnetic flux through successive gear teeth, and continuing to rotate said inductor coil relative to said beveled gear until each of said beveled gear teeth has been sufficiently heated;

wherein a number of said beveled gear teeth differs from a number of said projections, said method further including a step of:

continuing to rotate said inductor coil relative to said beveled gear teeth until a single one of said projections has meshingly engaged each of said gear teeth.

13. The method according to claim 12, further comprising the step of:

continuing to rotate said inductor coil relative to said beveled gear teeth until each of said projections has meshingly engaged with each of said gear teeth.

14. The method according to claim 13, further comprising the step of:

arranging said inductor coil and said beveled gear such that said inductor coil rotates about a first axis, said beveled gear rotates about a second axis, said first and second axes are acutely arranged relative to each other.

15. A method of induction heating a beveled gear having a plurality of beveled gear teeth; said method comprising the steps of:

providing a substantially annular inductor coil having a plurality of projections, said inductor coil being in continuous rotatable relationship with said beveled gear such that said projections meshingly engage said beveled gear teeth upon relative rotation between said inductor coil and said beveled gear teeth;

providing a current through said inductor coil such that a magnetic flux is induced directly through at least one of said gear teeth of said beveled gear while engaging one of said projections;

rotating said inductor coil relative to said beveled gear teeth while providing said current through said inductor coil such that continuous relative rotation between said beveled gear and said inductor coil successively induces magnetic flux through successive gear teeth, and continuing to rotate said inductor coil relative to said beveled gear until each of said beveled gear teeth has been sufficiently heated; and arranging said inductor coil and said beveled gear such that said inductor coil rotates about a first axis, said beveled gear rotates about a second axis, said first and second axes are acutely arranged relative to each other.

* * * * *